June 18, 1963   H. A. FERGUSON   3,094,012
HIGH-LOW REVERSE DRIVE
Filed June 2, 1961
FIG. 1
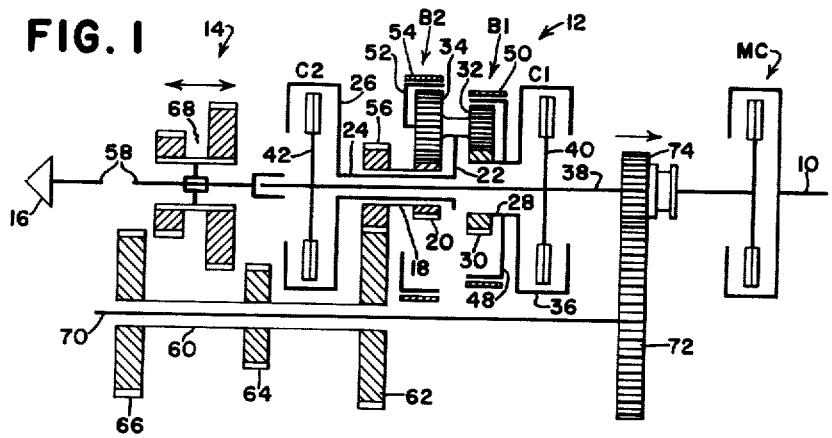
FIG. 2
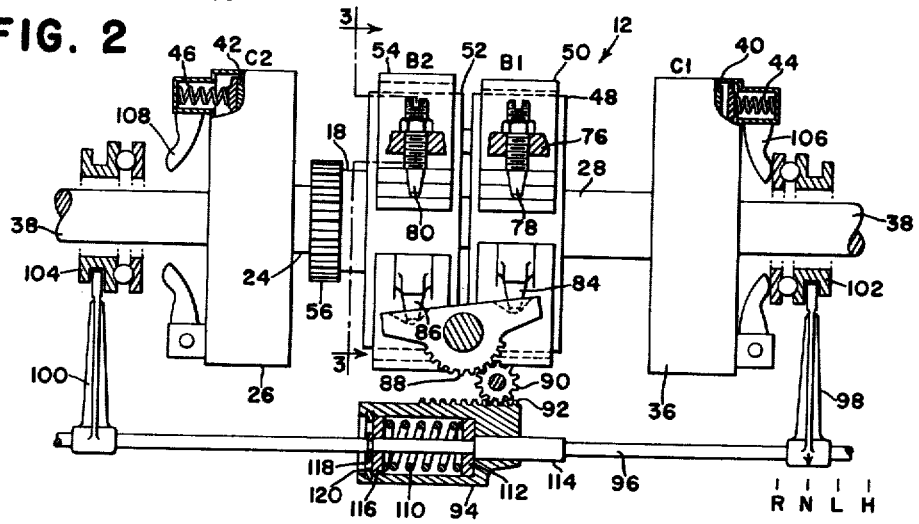
FIG. 3
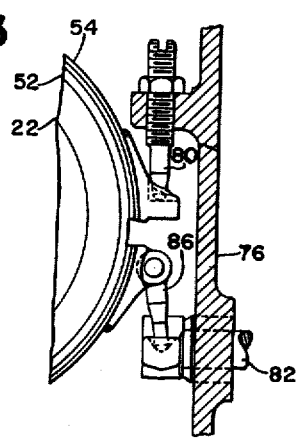
| X=ENGAGED | C2 | B2 | B1 | C1 |
|---|---|---|---|---|
| H |  | X |  | X |
| L | X |  |  | X |
| N | X |  |  |  |
| R | X |  | X |  |
FIG. 4
INVENTOR.
H. A. FERGUSON

United States Patent Office
3,094,012
Patented June 18, 1963

3,094,012
HIGH-LOW REVERSE DRIVE
Henry A. Ferguson, Waterloo, Iowa, assignor to Deere & Company, Moline, Ill., a corporation of Delaware
Filed June 2, 1961, Ser. No. 124,255
12 Claims. (Cl. 74—740)

This invention relates to a transmission especially adapted for vehicles and has for its principal object the provision of an improved compact transmission of the multi-range, multi-speed type.

Transmissions of the general character referred to are known and operate primarily on the principle of providing, for example, a two-speed transmission in series with a selective sliding gear transmission, the two-speed transmission being often termed a range section and the selective sliding gear transmission being known as a speed section. Therefore, the number of speeds in the speed section are doubled by the range section, since the range section will produce either high or low ranges. In most instances, the only reverse speeds that are obtainable are those provided in the selective sliding gear transmission or speed section. According to the present invention, a reversing drive is provided in the range section, in which sense the range section may be referred to as having three speeds, two forward and one reverse. Therefore, this not only doubles the forward speeds in the speed section but also provides a number of reverse speeds equal to one-half the total number of forward speeds.

It is another object of the invention to utilize epicyclic gearing in the range section, thus exploiting the simplicity thereof and the ability of such gearing to lend itself to relatively rapid changes between high and low speeds and between forward and reverse speeds without substantial loss of torque. The epicyclic gearing forming the subject matter of the present invention is unique in the sense that it provides two forward speeds and one reverse speed by the use of two clutches and two brakes, arranged coaxially in compact fashion because of the interjournalling of the input, output and carrier shafts.

It is a further object of the invention to provide improved control means for sequencing the operation of the clutches and brakes. In this respect, it is an object of the invention to provide a relatively simple transmission utilizing direct mechanical connections and thereby providing a drive that has many of the advantages of more expensive and more complicated types.

The foregoing and other important objects and desirable features inherent in and encompassed by the invention will become apparent as a preferred embodiment thereof is disclosed, by way of example, in the ensuing description and accompanying sheet of drawings, the figures of which are described below:

FIG. 1 is a schematic sectional illustration of the drive.
FIG. 2 is an enlarged fragmentary portion of the drive of FIG. 1 and particularly illustrating the controls.
FIG. 3 is an enlarged section on the line 3—3 of FIG. 2.
FIG. 4 is a table illustrating the operation of the range section of the drive.

Since the drive or transmission is especially adapted for use in heavy-duty vehicles such as agricultural and industrial tractors, it will be described in terms of such vehicles; although, the use of such expressions as "front," "rear" etc. should be taken as illustrative and not limiting. That is to say, in most vehicles the shafts in the power train run fore and aft as respects the length of the vehicle body, but there are instances in which the disposition of the shafting will be otherwise. With the foregoing in mind, there will be recognized in FIG. 1 a drive or transmission which proceeds from a drive shaft 10 through a range section 12 to a speed section 14 and thence to a final drive bevel pinion 16. Here again, the pinion 16 is merely illustrative of the many forms of elements that could be utilized in a final drive. The shaft 10 may be powered by any suitable source of power, such as an internal combustion engine (not shown), a factor which is largely immaterial for present purposes; although, in a comercial embodiment the type of power source would be significant in connection with the design of the power train from the standpoint of torque-transmitting characteristics.

The range section 12 includes a hollow output shaft 18 to the front end of which is coaxially fixed a rear sun gear 20. A coaxial planet gear carrier 22 is journalled ahead of the sun gear 20 and includes a rearwardly extending hollow carrier shaft 24 which extends loosely through the output shaft 18 and terminates as a rear part in the form of a clutch drum 26.

A hollow driven shaft 28 is coaxially journalled ahead of the planet carrier 22 and has fixed thereto a front sun gear 30, which is arranged relative to the rear sun gear 20 so that the planet carrier 22 lies axially intermediate the two sun gears. The carrier journals thereon a planet cluster including front and rear planet gears or pinions 32 and 34 which are respectively in constant mesh with the front and rear sun gears 30 and 20. The driven shaft 28 extends forwardly of the front sun gear 30 and terminates in a front part in the form of a front clutch drum 36.

A fore and aft input shaft 38 extends coaxially loosely through the driven, carrier and output shafts and has a fore part to which is fixed a clutch plate 40 cooperative with the front clutch drum 36 to provide a front clutch C1. The rear part of the input shaft 38 has fixed thereto a clutch plate 42 which combines with the rear clutch drum 26 to provide a rear clutch C2. Each clutch is biased into engagement in any conventional manner, representative of which are the springs 44 and 46 shown fragmentarily in FIG. 2 for the respective clutches.

The sun and carrier brakes are respectively applicable to the front sun gear 30 and carrier 22. In the present case, the sun gear brake B1 comprises a drum 48 which has a peripheral portion extending rearwardly to circumferentially overlie the planet pinion 32, and a conventional band 50 is selectively applicable to or releasable from the drum. The brake B2 comprises a drum 52 coaxially fixed to the carrier 22 and having a forwardly extending peripheral portion circumferentially overlying the rear planet pinion 34, plus a conventional band 54 which may be selectively applied to or released from the drum. The input shaft 38 is selectively connectible to or disconnectible from the drive shaft 10 by a master clutch, a typical representation of which is shown at MC. The output shaft 18 is utilized to drive the input or speed section 14 and for that purpose is here provided with an output gear 56 coaxial with the rear sun gear 20 and located axially intermediate the rear sun gear and the rear clutch C2.

The speed section 14 includes a transmission shaft 58 which is here coaxial with the rear part of the input shaft 38. Parallel to the input shaft 38 is a hollow countershaft 60 which has a front gear 62 in constant mesh with the output gear 56 and which further has second and third gears coaxially spaced along and secured to the countershaft, at 64 and 66, for selective mesh with a sliding gear cluster 68 on the transmission shaft 58. The countershaft gear 64 is just rearwardly of the rear clutch C2 and the arrangement here, as elsewhere, is such as to provide a compact organization of drive train components. It will be clear that the gear cluster 68 on the transmission shaft 58 may be shifted selectively into mesh with either of the gears 64 or 66 on the countershaft to provide either of two speeds for the transmission shaft. It will further be clear that additional gears could be provided on the countershaft for association with other gear clusters to multiply the number of speeds of rotation for the transmission shaft 58 and accordingly for the final drive pinion 16.

One reason for having the hollow countershaft 60 is to accommodate the coaxial extension therethrough of a power shaft 70, to the front end of which is coaxially fixed the gear 72. Splined or otherwise secured to the input shaft 38 for rotation therewith and for sliding therealong is a gear 74 meshable with the power shaft gear 72. When the position of the gear 74 is such that it meshes with the gear 72, the power shaft 70 is driven independently of the functioning of the range and speed sections. In the case of an agricultural tractor, this would furnish a power take-off shaft. The shaft 70 could, if desired, be extended forwardly of the gear 72 to provide a forward power take-off shaft.

The general principle of operation of the drive train is that by selective engagement and disengagement of the clutches and brakes C1, C2, B1 and B2, the range section will produce two forward speeds and one speed in reverse. The two forward speeds will of course double the number of speeds obtainable in the speed section 14, representative of which is the two-speed ability furnished by the transmission gear cluster 68 and countershaft gears 64 and 66. The reverse speed in the range section 12 will of course produce as many reverse speeds as there are speeds in the speed section 14. A short explanation of the operation of the range section will be obtained from FIG. 4, wherein it will be seen that low speed is produced by a direct drive which results from engagement of both clutches C1 and C2 while both brakes B1 and B2 are disengaged. This assumes, of course, that the master clutch MC is engaged. A change to high-range forward will result by retaining engagement of clutch C1, dropping clutch C2 and engaging brake B2. Reverse speed results from engaging brake B1 and clutch C2 while leaving the others disengaged. Neutral positions may be provided between high and low and between low and reverse; although, in most cases, one neutral position will be sufficient. In the present case, the neutral between low and reverse has been selected. It will be clear, of course, that the initials H, L, N and R in the table, as well as spaced along the control element in FIG. 2, stand respectively for High, Low, Neutral and Reverse.

It will also be understood that in a commercial embodiment the various components of the drive train will be appropriately journalled and supported. However, these details are not material here and therefore have not been illustrated. A representative fragment of a typical transmission housing is illustrated by the numeral 76 in FIG. 3, portions of which also appear in FIG. 2 for carrying fixed but adjustable anchors 78 and 80 respectively for the front and rear bands 50 and 54. A portion of the housing 76 below the anchors journals a transverse rockshaft 82 which has diametrically opposed arms extending fore and aft and connected to the opposite ends of the bands 50 and 54 by operators in the form of struts 84 and 86 respectively. The rockshaft also has fixed thereto, preferably integral with the arms that engage the struts 84 and 86, an arcuate rack portion 88 which meshes with a pinion 90 which in turn is actuated by a rack 92 on an operating device 94. This device is connected, by means to be presently described, to a fore and aft control element 96 which has rigidly affixed thereto front and rear forks 98 and 100 which are typically connected to or associated with front and rear throw-out bearings 102 and 104 respectively for operating the front and rear clutches C1 and C2.

As previously described, each clutch is biased to engagement and may be disengaged by moving its throw-out bearing against the throw-out fingers, as at 106 for the front clutch C1 and as at 108 for the rear clutch C2. For purposes that will presently appear, there is sufficient lost motion between the throw-out bearings or actuators 102 and 104 and their respective actuator fingers 106 and 108 to permit proper sequencing of engagement and disengagement of the two clutches in association with engagement and disengagement of the two brakes B1 and B2.

The device 94 comprises a housing within which is a coiled compression spring 110 abutted at its front end by a washer 112 which has shouldered engagement with an enlargement 114 on the rod 96, which passes loosely through the housing 94. The spring is abutted at its rear end by a washer 116 which is in turn backed up by a snap ring 118 secured to the element or rod 96. The front face of the bore in which the spring 110 is received forms a limit or abutment for the front face of the washer 112, and a snap ring 120 performs a similar function at the open end of the housing. Any suitable means, not material here, may be connected to the rod 96 for moving it back and forth or selectively in opposite directions among the four positions shown and designated at R, N, L and H; although, as previously stated, the neutral position could be omitted if desired.

In the present case, FIG. 2 represents a neutral condition in which the front clutch C1 is disengaged, as are both brakes B1 and B2; but the rear clutch C2 is engaged. Nevertheless, no torque will be transmitted, because if the speed section is in a position other than neutral, the output shaft gear 56, being in mesh with the gear 62, will partake of the load on the gear 62 and will tend, of course, to remain stationary. Therefore, even though the rear clutch C2 is engaged and drives the carrier shaft 24 and carrier 22, the result will be idle rotation of the front sun gear 30.

When the rod or element 96 is shifted forwardly, or to the right as seen by the reader, to the "L" position, the front actuator or throw-out bearing 102 will move away from the front clutch fingers 106, allowing the clutch C1 to return to its biased engagement. At the same time, the amount of movement, together with the lost motion designed into the control means, is such that the rear throw-out bearing 104 does not affect the fingers 108 on the rear clutch C2. Therefore, both clutches are engaged. As the rod 96 moves forwardly, it will pick up the device 94 via the rear snap ring 118 and rear washer 116, acting on the spring 110, moving the housing forwardly and rotating the pinion 90 in a counterclockwise direction, causing the clockwise rocking of the rocker 82. The amount of motion involved here is such as to further relax or release the front brake B1, while simply approaching but not achieving engagement of the rear brake B2. Therefore, the front sun gear 30 is free to be driven by the engaged front clutch C1, and the carrier 22 is locked up to the input shaft 38, and consequently to the front sun gear 30, by engagement of the rear clutch C2. Thus, the range section operates in direct drive, which in this case produces the lower of the two forward ranges.

Further forward movement of the control element or rod 96 results in the attainment of the "H" or high position, in which the throw-out bearing 102 moves farther forwardly away from the front clutch fingers 106, leaving the front clutch C1 engaged, but at the same time the rear throw-out bearing 104 picks up the fingers 108 on the rear clutch C2 and disengages that clutch. The amount of movement involved continues counterclockwise rocking of the pinion 90 and clockwise rocking of the rocker 82 so as to continue the released condition of the front brake B1 while applying or engaging the rear brake B2. With the rear brake B2 engaged, the carrier 22 is held and becomes the reaction member. It should be noted that the carrier is part of the rear clutch C2 but the rear clutch has been disengaged and the clutch plate 42 is free to rotate with the input shaft 38. Power is therefore transmitted from the input shaft 38 to the sun gear 30 because the front clutch C1 is engaged. Since the carrier 22 is held or locked up by engagement of the brake B2, the sun gear 20 will be driven via the planet cluster 32–34 on the basis of the gear ratios between the two sun gears and the two planet gears or pinions, which in this case produces overdrive, thereby resulting in high-range forward.

Movement of the control element 96 rearwardly from the "N" position in FIG. 2 to the "R" position in the same figure retains engagement of the rear clutch C2 while effecting disengagement of the front clutch C1, since the front throw-out bearing 102 engages the front clutch throw-out fingers 106. In this instance, the pinion 90 is rotating clockwise and the rocker 82 is rocking counterclockwise, continuing relaxation or releasing of the brake B2 while applying or engaging the brake B1. Drive then proceeds from an input shaft 38 through the engaged rear clutch C2 to the carrier 22. Since the front sun gear 30 is stationary, because the brake B1 is engaged, the planet cluster 32–34 produces reverse rotation of the rear sun gear 20 as the carrier 22 is driven by and in the same direction as the input shaft 38.

The arrangement of the controls has several advantages, significant among which are the conditions in which the front and rear throw-out bearings 102 and 104 are loaded and rotating or not rotating. For example, in low or direct drive, neither bearing is loaded. In high or overdrive, the rear bearing, although loaded, is not rotating, since the clutch drum 26 is part of the carrier and the carrier is held by the brake B2. In neutral, the rear bearing is neither loaded nor rotating and the front bearing, although loaded, is not rotating, since the clutch drum 36 is part of the sun gear 30 which is held by the brake B1. The linkage or control means is entirely mechanical and therefore is simple and effective without undue cost.

The overall arrangement of the range section in particular partakes of extreme compactness, which is exploited by the use of the hollow carrier and output shafts, which enables the arrangement of the two clutches C1 and C2 in coaxially spaced relationship with the epicyclic gearing between them. The drive from the output gear 56 to the transmission countershaft effectively bypasses the clutch C2 in a physical sense and enables fore and aft shortening of the overall drive train.

Features and advantages other than those categorically enumerated will readily occur to those versed in the art, as will many modifications and alterations in the preferred embodiment disclosed, all of which may be achieved without departure from the spirit and scope of the invention.

What is claimed is:

1. High-low-reverse drive mechanism, comprising: a hollow fore-and-aft output shaft having a rear sun gear fixed thereto; a planet carrier ahead of the output shaft and having a hollow carrier shaft fixed thereto and extending coaxially loosely through said output shaft to a rear part behind the rear sun gear; a hollow driven shaft coaxial with and journaled relative to said carrier and carrier shaft and having a front sun gear fixed thereto ahead of said carrier; interconnected planet gears journaled on the carrier and including front and rear planet gears meshing respectively with the front and rear sun gears; an input shaft extending coaxially loosely through the driven, carrier and output shafts and having a front part ahead of the front sun gear and a rear part behind the rear sun gear; a front clutch ahead of the front sun gear and selectively engageable and disengageable between the front sun gear and input shaft front part; a rear clutch behind the rear sun gear and selectively engageable and disengageable between the rear parts of the input and carrier shafts; a sun brake selectively engageable with and disengageable from the front sun gear; a carrier brake selectively engageable with and disengageable from the carrier; and control means connected to and for selectively operating the clutches and brakes in combinations including both clutches engaged and both brakes disengaged, from clutch and carrier brake engaged and the others disengaged, and sun brake and rear clutch engaged and the others disengaged.

2. The invention defined in claim 1, in which: the sun brake includes a drum coaxially fixed to the front sun gear and having a peripheral portion extending rearwardly and circumferentially overlying the front planet gear, and the carrier brake includes a drum coaxially fixed to the carrier and having a peripheral portion rearwardly adjacent to the sun brake drum and circumferentially overlying the rear planet gear.

3. The invention defined in claim 1, including: an output gear fixed to the output shaft axially between the rear sun gear and rear clutch; and driven means including a gear in mesh with said output gear.

4. The invention defined in claim 3, in which: said driven means gear is rotatable on an axis parallel to the output, driven, carrier and input shafts and is centrally apertured; a fore-and-aft power shaft extends coaxially loosely through said driven means gear and has a fore part adjacent and parallel to the front part of the input shaft; and drive gearing is provided between the input and power shafts, including a gear coaxial on and rotatable with the front part of the input shaft ahead of the front clutch and a meshing gear coaxial on and rotatable with said fore part of the power shaft.

5. The invention defined in claim 1, in which: the control means comprises a single control element movable selectively to opposite sides of an intermediate position and having front and rear connections respectively to the front and rear clutches and sun and carrier brake connections respectively to the sun and carrier brakes for causing engagement of both clutches and disengagement of both brakes in said intermediate position and operative upon movement of said element to one side of said intermediate position to disengage only one clutch and to engage only one brake and operative upon movement of said element to the other side of said intermediate position to disengage only the other clutch and to engage only the other brake.

6. The invention defined in claim 1, in which: each clutch is biased to engagement and includes an actuator movable selectively in opposite directions to cause engagement and disengagement of the associated clutch, each actuator being arranged for overtravel in one direction to leave its clutch engaged, the control means includes a control element movable to opposite sides of an intermediate position, means connecting the element to the actuators for movement in unison to cause engagement of both clutches in said intermediate position and to alternately disengage the clutches upon movement of said element to opposite sides of said intermediate position, the brakes are individually biased to disengaged position and respectively include operators movable to cause individual engagement thereof, and said element includes connecting means to the operators arranged to have both brakes disengaged while said element is in its intermediate position and operative to alternately move the operators to alternately engage the brakes upon movement of said element to opposite sides of said intermediate position.

7. The invention defined in claim 6, in which: said connecting means includes a two-way-acting yielding force-transmitting device between the element and the operators for enabling overtravel of the element in either direction relative to the brake operators.

8. The invention defined in claim 1, including: a transmission shaft rearwardly of and coaxial with the rear part of the input shaft; an output gear fixed to the output shaft between the rear sun gear and the rear clutch; a countershaft parallel to the transmission shaft and including a first gear ahead of the rear clutch and meshing with the output gear and a second gear rearwardly of the rear clutch; and a gear on the transmission shaft meshable with the second gear on the countershaft.

9. The invention defined in claim 1, including: a transmission shaft rearwardly of and coaxial with the rear part of the input shaft; a countershaft parallel to the transmission shaft and including a first gear ahead of the rear clutch and driven by the output shaft, second and third gears coaxially spaced along and fixed to the countershaft rearwardly of the rear clutch, and a sliding gear cluster on the transmission shaft selectively drivable by either of said second and third gears.

10. The invention defined in claim 1, including: driven means including a gear ahead of the rear clutch and driven by said output shaft.

11. The invention defined in claim 1, including: a transmission shaft rearwardly of, coaxial with and journaled relative to the rear part of the input shaft; a countershaft radially offset from the rear clutch and parallel to the transmission and input shafts and having front and rear parts respectively ahead of and behind the rear clutch; drive means between the input shaft and the countershaft front part; and other drive means between the countershaft rear part and the transmission shaft.

12. The invention defined in claim 11, in which: the countershaft is hollow; a power shaft extends coaxially loosely through said countershaft and has front and rear ends respectively ahead of and behind said countershaft front and rear parts; and further drive means is operative between said power shaft front end and a portion of the input shaft ahead of the front clutch.

References Cited in the file of this patent

UNITED STATES PATENTS

| | | |
|---|---|---|
| 2,813,437 | Kelbel et tal. | Nov. 19, 1957 |
| 2,821,869 | Kelbel | Feb. 4, 1958 |
| 2,890,603 | Harris et al. | June 16, 1959 |

UNITED STATES PATENT OFFICE

CERTIFICATE OF CORRECTION

Patwnt No. 3,094,012 June 18, 1963

Henry A. Ferguson

It is hereby certified that error appears in the above numbered patent requiring correction and that the said Letters Patent should read as corrected below.

Column 6, line 1, for "from" read -- front --.

Signed and sealed this 21st day of January 1964.

(SEAL)
Attest:
ERNEST W. SWIDER

EDWIN L. REYNOLDS

Attesting Officer

Acting Commissioner of Patents